United States Patent [19]

Gilbert et al.

[11] Patent Number: 5,178,361
[45] Date of Patent: Jan. 12, 1993

[54] BALL VALVE CONTROL

[75] Inventors: Paul A. Gilbert; Thomas V. McEwen; Terry V. Jobe, all of Vicksburg, Miss.

[73] Assignee: The United States of America as represented by the Secretary of the Army, Washington, D.C.

[21] Appl. No.: 908,206

[22] Filed: Jul. 2, 1992

[51] Int. Cl.⁵ .............................................. F16K 31/02
[52] U.S. Cl. ........................... 251/129.05; 251/129.11; 251/129.12
[58] Field of Search ...................... 251/129.11, 129.12, 251/129.05, 129.14

[56] References Cited

U.S. PATENT DOCUMENTS

| | | | |
|---|---|---|---|
| 3,334,859 | 8/1967 | Raymond, Jr. | 251/129.12 |
| 4,097,786 | 6/1978 | Lund | 251/129.11 |
| 4,364,111 | 12/1982 | Jocz | 251/129.11 |
| 4,499,920 | 2/1985 | Steffan et al. | 251/129.11 |

Primary Examiner—A. Michael Chambers
Attorney, Agent, or Firm—Darrell E. Hollis

[57] ABSTRACT

An interface between the CPU and a motor for actuating a zero displacement valve as disclosed. First and second switches each having a normally closed pole sense the closed position of the valve when the normally closed pole of the first switch is open and the open condition of the valve when the normally closed pole of the second switch is open. A motor starter completes a power circuit to the motor when energized and a logic chip having a starter input is responsive to the switch positions and a starter input of a select polarity for energizing the motor starter when the normally closed pole of one of the switches is open and the other is closed and the motor actuator state is changed to an appropriate polarity.

23 Claims, 2 Drawing Sheets

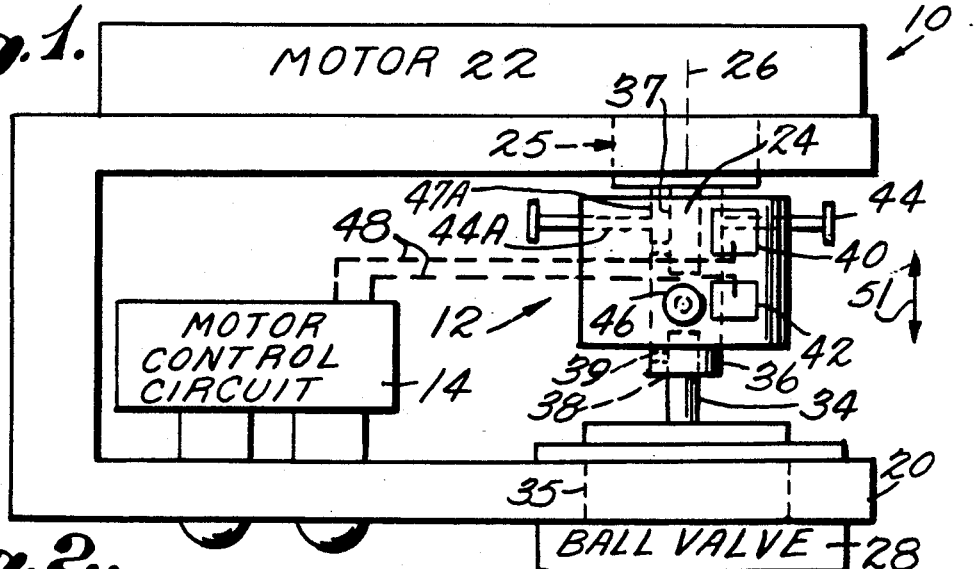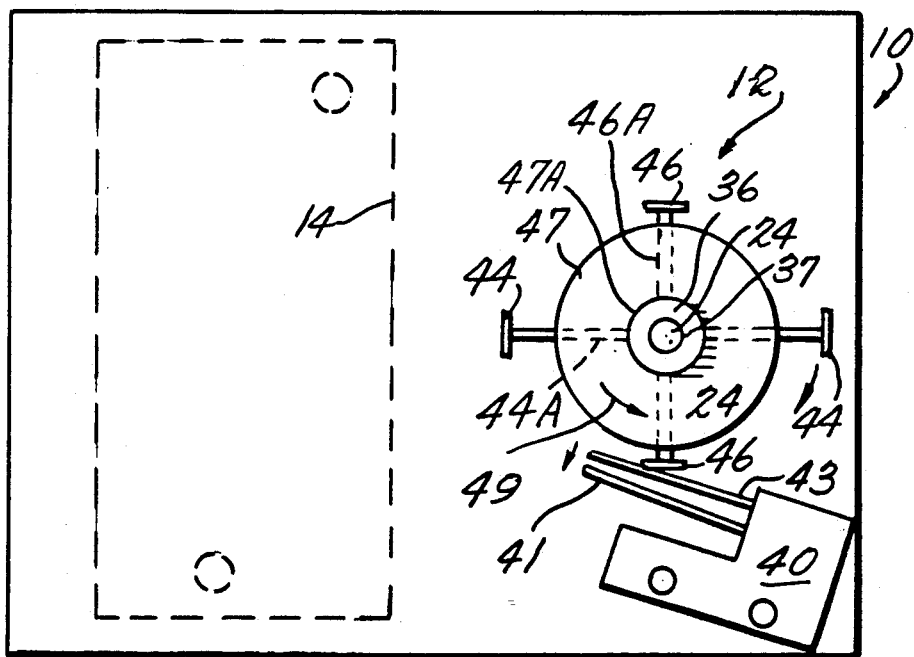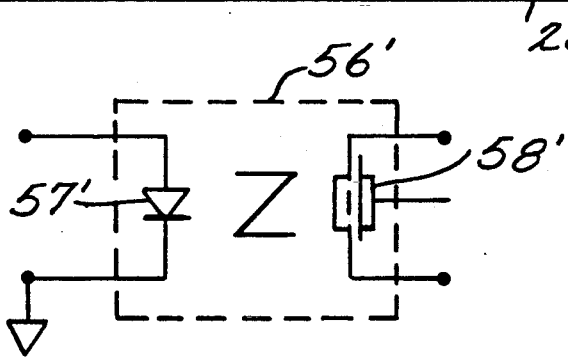

ized to the selected polarized input. In a particular embodiment, the logic chip comprises a quad two-input NAND gate including first and second inverters coupled in series with the first switch therebetween and a second inverter coupled in series with the second switch. A NAND gate has a first input coupled to the second inverter and a second input coupled to the third inverter. The first inverter and second switch are commonly coupled to the starter input.

BALL VALVE CONTROL

BACKGROUND OF THE INVENTION

The invention relates to a valve control, and more particularly to an interface for a computer operated ball valve actuator that allows for flow control without volume displacement. The invention is particularly useful in laboratory testing and other processes requiring high precision flow control.

In certain laboratory processes, it is necessary to open and close fluid lines in a piping or plumbing system with no resulting volume displacement. In laboratory soil testing, for example, the piping system is often water saturated and of very low compliance. Accordingly, volume displacement associated with the operation of normal valves can cause pressure surges and fluctuations in the system which may alter specimen behavior, corrupt measured constitutive properties data and invalidate the test. Additionally, under certain conditions, sensitive electronic measurement devices used in the piping system could be damaged or destroyed by the use of volume displacement valves. For these reasons, ball valves are used for soils and other critical laboratory testing where volume control is critical and in hydraulic networks where frictional losses resulting from fluid flow must be minimized. Ball valves are configured with an orifice drilled through a cylinder or sphere in the valve stem such that no volume is displaced as the orifice within the stem is turned perpendicular to the flow, closing the associated line. If it is desired to automate a laboratory soils test or a process involving a hydraulic network where frictional losses must be minimized, then ball valves controlled by a computer or other logic network is required.

A commercially available system to open and close ball valves consists of an air operated, double acting load cylinder, a rack and spur gear and a ball valve. Air pressure, controlled by a four-way solenoid valve, drives the load cylinder which moves the rack and turns the spur gear which is attached to the stem of the ball valve. This known arrangement allows the valve to be opened or closed in response to directed air pressure pulses. Some disadvantages are evident in this system, most notably, the arrangement is physically large in size, it is high cost, and it is mechanically complex. The requirement for an air pressure supply for the solenoid valve is particularly inconvenient. Further, the system produces electronic noise which can upset delicate individual electronic circuits. Further, present commercially available systems have no accompanying electronics to allow communication or interface with other devices or with a logic network.

SUMMARY OF THE INVENTION

The present invention obviates the shortcomings and disadvantages of the described prior arrangements. In particular, one aspect of the invention is directed to an apparatus for opening and closing a valve. Another aspect of the invention is directed to an interface for a central processing unit (CPU) and a motor for actuating a zero volume displacement valve in one direction between open and closed positions. First and second normally closed double pole switches sense the closed position of the valve when the first and second switches are in different states, that is when the first switch is in the open or forward position and the second switch is in the closed or reverse position, and likewise sense the open position of the valve when the first and second switches are in different states opposite from the first mentioned states. When energized, a motor starter comprises a power circuit to the motor. A logic chip having a starter input for receiving a polarized input is responsive to the first and second switches and is operatively coupled to the motor starter for selectively energizing the motor starter when the first and second switches are in different states and when the starter input is enabled to a selected polarized input. In a particular embodiment, the logic chip comprises a quad two-input NAND gate including first and second inverters coupled in series with the first switch therebetween and a second inverter coupled in series with the second switch. A NAND gate has a first input coupled to the second inverter and a second input coupled to the third inverter. The first inverter and second switch are commonly coupled to the starter input.

DESCRIPTION OF THE DRAWINGS

FIG. 1 is a schematic view of an automated valve control in accordance with the present invention illustrating mechanical components and an electronics package;

FIG. 2 is a plan view of the arrangement illustrated in FIG. 1;

FIG. 4 illustrates an alternative relay.

DESCRIPTION OF THE PREFERRED EMBODIMENT

Figure 3:
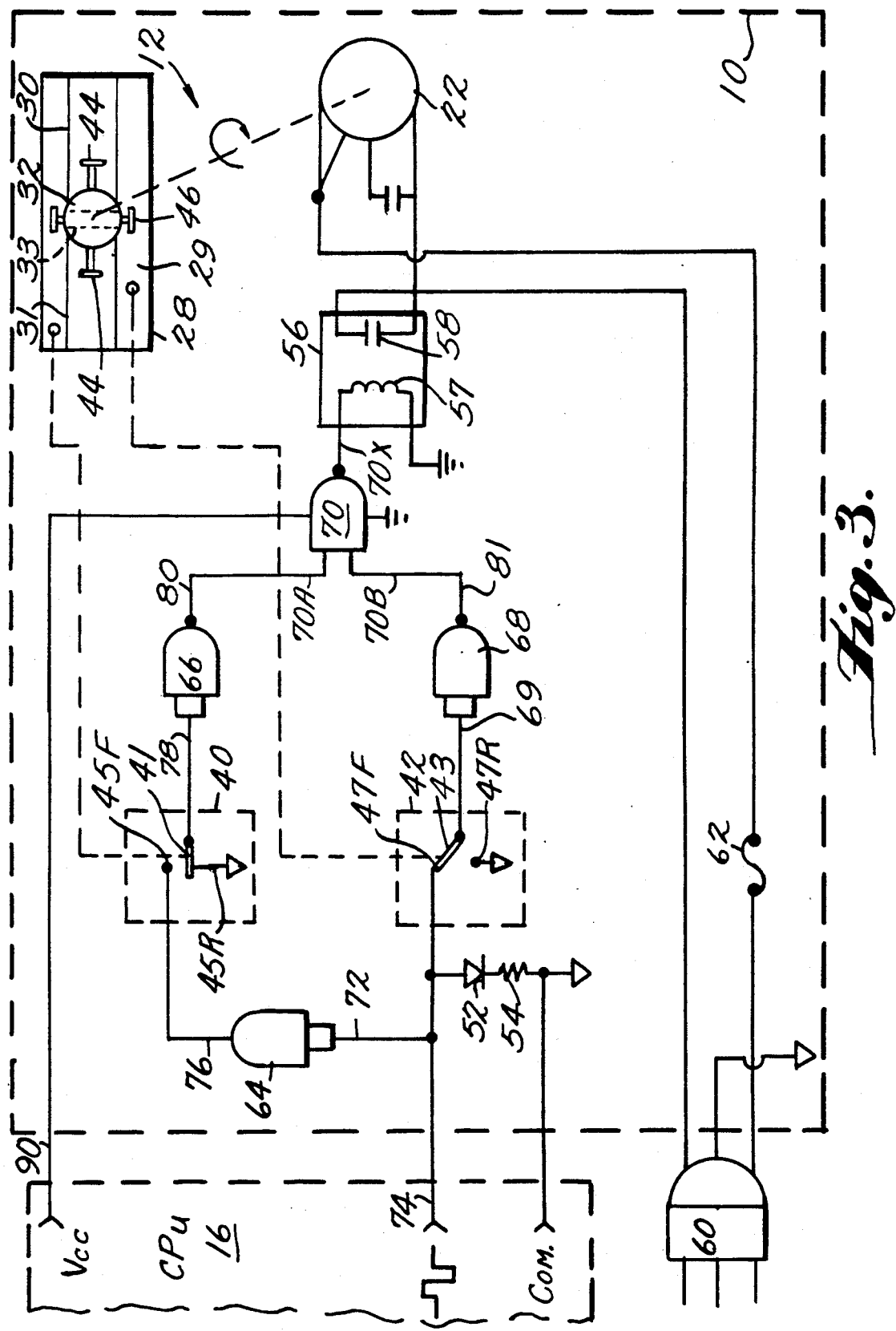
FIG. 3 is a schematic diagram of the electrical components forming the control circuit of the present invention.

The general schematic of the automated valve system 10 of the present invention is illustrated in FIGS. 1-3. The system includes mechanical components 12 generally shown in FIGS. 1 and 2 and an electronics package 14 shown in detail in FIG. 3. The electronics package 14 serves as an interface to allow communication with and control by a computer or central processing unit (CPU) 16. The mechanical components 12 and their operation and the logic for controlling the electronics package 14 are described below.

The mechanical components 12 include a frame 20 and a small electric motor 22, which is preferably an AC synchronous motor. The motor 22 is mounted on the frame and has a shaft 24 which extends inwardly of the frame through an aperture 25 along an axis of rotation or axis 26. A fully rotatable ball valve 28 of a known type is mounted to the frame 20. The ball valve 28 has a hollow body portion 29 with an inlet 30 and an outlet 31 aligned therewith. A ball 32 is rotatably secured in the body 29. The ball has a through opening 33 which is alignable with the inlet 30 and outlet 31 when the valve 28 is open and is transverse to the inlet 30 and outlet 31 when the valve 28 is closed. The cross-sectional area of the inlet 30, outlet 31 and opening 33 are substantially equal. A stem 34 is secured in the body 29 transverse of the opening 33. The stem 34 extends through an aperture 35 in the frame 20 along the axis 26. The motor shaft 24 and the stem 34 are axially aligned as illustrated. A drive shaft adaptor 36 interconnects the shaft 24 and the stem 34. In particular, the drive shaft adaptor 36 has a pair of axially aligned opposite keyways 37 and 38 which receive the shaft 24 and stem 34 therein as illustrated. Set screws 39 secure the shaft 24 and the stem 34 with respect to the drive shaft adaptor 36. The arrangement described above allows the valve 28 to be turned by the motor 22, and because the valve is fully rotatable, it is not necessary to reverse direction of the motor 22 to close the valve.

It is necessary to conclusively sense whether the valve 28, is open or closed. This is accomplished by means of a pair of sensors or switches 40 and 42 which sense the position of the valve stem 34 and hence the opening 33. The switches 40 and 42 are Single Pole Double Throw (SPDT) devices respectively having normally closed, forward contacts 45F and 47F and normally open, reverse contacts 45R and 47R. Respective switch arms 41 and 43 operate switches 40 and 42. First and second cam screws 44 and 46 are secured in axially and circumferentially spaced relation in respective threaded radial openings 44A and 46A in an adjustable cam adaptor 47 operate respective switches 40 and 42. The cam adaptor 47 is an annular cylinder having a central opening 47A sleeved on the drive shaft adaptor 36 which carries the cam screws 44 and 46 on the cam adaptor 47 so as to extend in a direction generally transverse of the opening 33 in the ball 32 as illustrated in FIG. 3. Further, the cam screws 44 and 46 are vertically offset from each other so as to provide clearance for the corresponding switches 40 and 42.

The cam screws 44 and 46 serve a dual purpose. First, they carry the cams which engage respective switches 40 and 42. Second, when threaded into position, as shown in the drawings, the cam screws 44 and 46 act as set screws to adjustably secure the cam adaptor 47 to the drive shaft adaptor 36. In order to properly operate the valve precicely, the position of the cam screws with respect to the valve opening 33 must be adjusted properly. In the present invention this is accomplished by providing for circumferential and axial adjustment of the position of the cam adaptor 47 which carries the cam screws 44 and 46 on the drive shaft adaptor 36. Thus, the position of cam set screws 44 and 46 may be adjusted with respect to the opening 33 in the ball 32. See for example, arrow 49 in FIG. 2 and arrow 51 in FIG. 1. In a preferred embodiment, the cam screws 44 and 46 are generally the same length. The different lengths shown in the drawing is to simplify the illustration.

When one of the cam screws 44 engages the switch arm 41, the pair of normally closed forward switch contacts 45F (FIG. 3) are open which indicates that the ball valve 28 is in the closed condition as illustrated. Likewise, when one of the cam screws 46 engages the switch arm 43, the set of normally closed forward switch contacts 47F are opened which indicates that the ball valve is likewise open. This condition is the opposite of that shown in FIG. 3. The switches 40 and 42 are coupled to the electronic components 14 by means of the leads 48. The condition of the first and second switches 40 and 42 is sensed by the electronic circuitry 14 so as to unambiguously identify the state of the valve 28 whether opened or closed. This arrangement also allows logic commands from the computer or CPU 16 to operate motor 22, opening or closing the valve 28.

Although only one valve 28 is shown, it should be understood that many valves may be opened and closed simultaneously using the system of the invention. It should also be understood that with the mechanical and electronic configuration of the present invention, computer commands in the form of a software program required to precisely control the operation of the system is minimal. In essence, it is necessary only to identify the condition of the switches 40 and 42 so as to have an unambiguous indication of the valve condition.

Referring to FIG. 3, the electronics components 14 include a quad, two-input NAND gate 50, which operates as a logic gate network. A light emitting diode (LED) 52 in series with a current limiting resistor 54 provides an indication as to whether the valve is open or closed. In a preferred embodiment, the switches 40 and 42 are subminiature integral lever microswitches which are selectively coupled in series within the gate 50.

A relay 56 is coupled to an output 70X of the gate 50. The relay 56 is serially coupled to the motor 22, power supply 60 and fuse 62. The power supply 60 is preferably an AC source. The relay 56 may be a known kind having a low voltage coil 57 in circuit with the logic output 70X and normally open contacts 58 operable by the coil 57 in circuit with the power supply 60. Alternatively, the relay may be a light activated solid state switch or the like including an LED 57' and a light responsive switch 58' (FIG. 4)

The gate 50 includes three inverters 64, 66 and 68 and a NAND gate 70. The inverters 64, 66 and 68 are NAND gates which have their inputs joined together as shown. The inverter 64 has an input 72 coupled to a motor starter input 74. In the embodiment herein described, the starter input is adapted to carry a polarized input control signal, that is a high (Logic 1) or low (Logic 0) to open or close the valve. The output 76 of the inverter 64 is coupled to the input 78 of inverter 66 via the forward contacts 45F of switch 40. The output 80 of the inverter 66 is coupled to one input 70A of the NAND gate 70.

Inverter 68 has an input 69 coupled in series with the forward contacts 47F of switch 42 and is commonly coupled with the input 72 of inverter 64 and the starter input 74. Likewise, LED 52 is commonly coupled with the starter input 74 via the limiting resistor 54 to ground or common. In accordance with the invention when the starter input 74 is high, the LED 52 is activated and it emits light indicating an open command has been placed on the starter input 74.

A source of 5 V DC power (Vcc), is supplied by an external power supply or a digital output channel 75 of the computer 16, as shown, to enable the gate 50. The motor 22 is as aforesaid preferably an AC synchronous motor. The fuse 62 provides protection for the motor and safety.

The illustration of FIG. 3 shows the valve 28 in the closed position with the opening 33 transverse to the input 30 and output 31. The quad, two-input NAND gate 50, is a device which has sufficient electronics to provide capacity for the three inverters 64, 66 and 68 and NAND gate 70. Of course, discrete devices could be used but are less economical.

In accordance with the invention, selected input parameters are chosen for the gate 50 as follows: logic 0 on the starter input 74 closes the valve 28; logic 1 on starter line 74 opens the valve 28. The input logic may be applied manually or by the computer 16 or some other logic network.

The NAND gate 70 has two inputs 70A and 70B and an output 70X. The following is a truth table which defines the state of the output 70X in terms of the state of each of the inputs 70A and 70B.

TABLE 1

NAND Gate Truth Table

| 70A | 70B | 70X |
|-----|-----|-----|
| 0 | 0 | 1 |
| 1 | 0 | 1 |
| 0 | 1 | 1 |
| 1 | 1 | 0 |

Table 2 is an overall truth table for the logic of the present invention.

TABLE 2

| SW 40 NC-45F | SW 42 NC-47F | Inp 74 | LED 52 | Gate 62 Output | Gate 64 Input | Gate 66 Input | NAND GATE 70 70A | 70B | 70X | |
|---|---|---|---|---|---|---|---|---|---|---|
| O | C | 0 | OFF | 1 | 0 | 0 | 1 | 1 | 0 | Valve closed |
| O | C | 1 | ON | 0 | 0 | 1 | 1 | 0 | 1 | Start motor |
| C | C | 1 | ON | 0 | 0 | 1 | 1 | 0 | 1 | In transition |
| C | O | 1 | ON | 0 | 0 | 0 | 1 | 1 | 0 | Motor stopped Valve open |
| C | O | 0 | OFF | 1 | 1 | 0 | 0 | 1 | 1 | Start motor |
| C | C | 0 | OFF | 1 | 1 | 0 | 0 | 1 | 1 | In transition |
| O | C | 0 | OFF | 1 | 0 | 0 | 1 | 1 | 0 | Motor stopped Valve closed |

Forward contacts 45F and 47F are NC - Normally Closed and open when corresponding cam set engages switch arm. Reverse contacts of each switch opposite condition of forward contacts.

In the following description reference to the NAND gate logic (Table 1) and the logic condition of the overall circuit (Table 2) may be useful. Beginning with the valve 28 in the closed position, and assuming that a logic 0 exists at the starter input 74, the motor 22 is stopped and the cam set 44 is in contact with the arm 41 of switch 40. Accordingly, the normally closed forward contacts 45F are open circuit. The reverse contacts 45R are closed and thereby coupled to ground as shown. The switch 42 is not in contact with its corresponding cam set 46. Accordingly, its normally closed, forward contacts 47F are closed and its reverse contacts 47R are open. Under these circumstances, the inverter 68 is coupled directly by the closed contacts 47F to the starter input 74, as illustrated. The LED 52 is "OFF" indicating a logic 0 input on the starter input 74. The output 76 of inverter 64 is a logic 1 (i.e., the opposite of its input 72). However, because the contacts 45F are open, the state of its output 76 is presently out of the circuit. With the reverse contacts 45R closed to ground, the input 78 of inverter 66 is likewise coupled to ground and is therefore low. Therefore a logic 0 exists at the input 78 of inverter 66 Thus, with the logic 0 at the input 78 of inverter 66 and a logic 0 at the input 69 of inverter 68, a logic 1 exists at their respective outputs 80 and 81. The corresponding inputs 70A and 70B of NAND gate 70 are logic 1 and the output 70X is a logic 0 (see Table 1). Accordingly, no current flows in the relay 56 and no voltage is applied to start the motor 22.

To initiate operation of the valve from the closed position shown to the open position, a logic 1 is applied to the starter input 74. The LED 52 now receives a signal of the proper polarity and turns "ON" to produce an output indication. The output 76 of inverter 64 goes to a logic 0 when the starter input 74 goes high as indicated. At this time the forward contacts 45F of the switch 40 are open. The input 78 of inverter 66 remains at logic 0 and its output 80 is at logic 1. The input 69 of the inverter 68 follows the starter input 74 to logic 1. Therefore, its output 81 goes to logic 0. Input 70A of NAND gate 70 remains at logic 1 and the other input 70B goes to logic 0 which thereby changes the output 70X of the NAND gate 70 to logic 1 in accordance with Table 1. Under these conditions, current flows through the relay coil 57 causing the contacts 58 to close and thereby supply voltage to start the motor 22. As the motor rotates, the cam set 44 moves away from switch 40 releasing arm 41 whereby the forward contacts 45F move to the normally closed position. Consequently, the output 76 of inverter 64 is coupled to the input 78 of inverter 66 through the closed forward contacts 45F of switch 40. The output 76 of the inverter 64 is logic 0 because its input is logic 1. Accordingly, the state of the output 80 inverter 66 remains the same and the motor continues to rotate until a cam set 46 contacts the arm 43 of switch 42. When this happens, forward contacts 47F open and the reverse contacts 47R close, thereby applying a logic 0 from ground to the input 69 of inverter 68 causing its output 81 to go high thereby applying a logic 1 to input 70B of gate 70. With a logic 0 at the input 78 of inverter 66, its output 80 is high, therefore a logic 1 exists on the input 70A of the gate 70. Accordingly, the output 70X goes low and the coil 57 of the relay 56 is de-energized thereby opening contacts 58. The logic 1 is maintained on the input 74 whereby the LED 52 remains "ON" indicating that the valve 28 is open.

To close the valve 28 a logic 0 is applied to the starter input 74. The LED 52 goes "OFF" and the output 76 of inverter 64 goes to a logic 1 and applies the same through the closed forward contacts 45F of switch 40 to the input 78 of inverter 66, thereby causing its output to go to a logic 0. In accordance with the truth table, any logic 0 on the gate 70 causes the output 70X to go high thereby activating the coil 57 and closing contacts 58 whereby the motor 22 is activated. At the same time, the input 69 of the inverter 68 is maintained at a logic 0 through the closed reverse contacts 47R of switch 42. Thus, its output 81 is a logic 1. As the motor rotates, the cam set 46 moves away from arm 43 releasing the switch 42 so that reverse contacts 47R open and its forward contacts 47F move to the normally closed position. The input 69 to the inverter 68 however remains at a logic 0 despite the change in position of switch 42 because the starter input 74 is also a logic 0. Accordingly, the output 81 of inverter 68 remains high. The motor therefore continues to turn until the cam set 44 contacts the arm 41 of the switch 40. The forward contacts 45F of the switch 40 are now open applying a logic 0 to the input 78 of inverter 66 thereby changing its output state 80 from a 0 to a 1. With both inputs 70A and 70B of gate 70 at logic 1, the output 70X goes low thereby deenergizing the coil set 57 and opening contacts 58 to cut off power to motor 22.

The sequence can be continued by simply toggling the state of the starter input 74 between 0 and 1 to open and close the valve 28.

Particular advantages of the proposed logic controlled valve of the present invention are that it may be controlled with very simple software and short routines which would permit fast computer operation. Simultaneous operation and control of many valves is not only possible, but may be made very simple by the electronic circuitry herein described. Also, the valve state whether open or closed is easily identified and recognized by a computer or other logic system simply by sensing the condition of a pair of switches. Thus, precision valve positioning is possible. Another important feature of the present invention is that it is less expensive to fabricate and it is of a much reduced size than currently available systems. Further, the system is mechanically simpler and easier to use than available systems. In prior arrangements described, solenoid valves with their attendant electronic interference are not required Practical and simplified remote applications are possible due to the simplicity and reliability of the system which is based upon proven reliability of the individual components. Finally, the invention as described, is easily extended to other configurations, for example, three way valves, four way valves and the like.

The electronic control system of the present invention as described herein is compatible with standard TTL and CMOS technology which thereby allows the system to interface with currently available processors. On the other hand, the prior, electro-mechanical systems have no electronic interface and are thus not easily amenable for communication with standard logic devices.

While there has been described what at present is considered to be the preferred embodiment of the present invention, it will be apparent to those skilled in the art that changes and modifications may be made therein without departing from the invention and it is intended in the appended claims to cover such changes and modifications as fall within the true spirit and scope of the invention.

What is claimed:

1. An interface between a central processing unit and a motor for actuating a zero volume displacement valve for rotation in one direction between open and closed positions comprising:

first and second double pole switch means each having a normally closed pole for sensing the closed position of the valve when the normally closed pole of the first switch is open and for sensing the open condition of the valve when the normally closed pole of the second switch is open;

a motor starter coupled to the motor for completing a power circuit to the motor when energized; and logic means having a starter input for receiving a starter signal of a first polarity for initiating an opening of the valve and for receiving a signal of a second polarity for initiating a closure of the valve, said logic means being responsive to the switch positions and operatively coupled to the motor starter for selectively energizing the motor starter when the normally closed pole of the first and second switch means is open and the other is closed and the motor actuator input is changed to the corresponding first and second polarity.

2. The interface of claim 1, wherein the first and second switch means comprises a single pole double throw (SPDT) switch.

3. The interface of claim 1, wherein the motor starter comprises a relay having a coil in circuit with the logic means and a set of contacts in the power circuit, said contacts being actuated for completing the power circuit in response to a signal to the relay coil from the logic means.

4. The interface of claim 1, further comprising first and second cam means, said first cam means being operatively coupled between the valve and the first switch means when the valve is closed and the second cam means being operatively coupled between the valve and the second switch when the valve is open.

5. The interface of claim 4, wherein the first cam means engages the first switch for opening the normally closed pole and the second cam means engages the second switch means for opening the normally closed pole.

6. The interface of claim 4, wherein the first and second cam set means are displaced one from the other for engaging the respective first and second switch means.

7. The interface of claim 6, wherein the first and second cam means are adjustably mounted relative to the open and closed positions of the valve.

8. The interface of claim 1, wherein the logic means comprises NAND gate means having at least two inputs and wherein said NAND gate means produces an output for energizing the starter only when the inputs are not the logic state.

9. The interface of claim 8, wherein the NAND gate means comprises a NAND gate an output which is operative for deenergizing the motor starter only when both inputs are at logic 1.

10. The interface of claim 8, wherein the logic means further comprises first and second inverter means serially coupled to the first switch means and one input of the NAND gate means and third inverter means in series with the second switch means and a second input of the NAND gate means.

11. The interface of claim 1, wherein the valve is a ball valve capable of moving between open and closed positions without displacing a substantial volume.

12. The interface of claim 1, wherein the logic means comprises a quad four, two-input NAND gate including three NAND gates having common inputs operable as an inverter and one NAND gate responsive to selected ones of the inverters at its inputs.

13. The interface of claim 12, wherein the NAND gate is responsively coupled to a serial connection of two of said inverters and said first switch means therebetween and a second input of said NAND gate is responsively coupled to a third one of said inverters in series with said second switch means.

14. The interface of claim 12, wherein the first switch means is coupled between an input and an output of said first and second inverters respectively and the second switch means is coupled to an input of the third inverter.

15. The interface of claim 13, wherein the first switch means and an input of the first inverter means are commonly coupled to the starter input and an output of the second and third inverter is coupled to respective inputs of the NAND gate.

16. The interface of claim 1, wherein the motor starter is a relay including a coil and a set of contacts.

17. The interface of claim 1, wherein the motor starter is a relay including a light emitting diode in circuit with the logic means and a light responsive switching means in circuit with the motor and responsive to the light emitting diode for completing a circuit to the motor when the LED is energized.

18. An apparatus for opening and closing a valve comprising:
a motor for driving the valve between open and closed position;
adjustable cam means for sensing the valve position;
first and second double pole switch means respectively coupled to the adjustable cam means, each having a normally close pole for sensing the closed position of the valve when the normally closed pole of the first switch is open and for sensing the open condition of the valve when the normally closed pole of the second switch is open;
a motor starter coupled to the motor for completing a power circuit to the motor when energized; and
logic means having a starter input for receiving a starter signal of a first polarity for initiating an opening of the valve and for receiving a signal of a second polarity for initiating a closure of the valve, said logic means being responsive to the switch positions and operatively coupled to the motor starter for selectively energizing the motor starter when the normally closed pole of the first and second switch means is open and the other is closed and the motor actuator input is changed to the corresponding first and second polarity.

19. The apparatus according to claim 18, wherein the adjustable cam means comprises:
a sleeve secured between the valve and the motor and being circumferentially adjustable relative to the first and second switch means, and cams secured to the sleeve for engaging the first and second switch means.

20. The apparatus according to claim 19, wherein the motor and valve have opposing shafts and a drive shaft adaptor interconnects said shafts;
said sleeve being adjustably secured to the drive shaft adaptor for rotation therewith.

21. The apparatus according to claim 20, wherein the drive shaft adaptor is a cylindrical member and the sleeve is an annular adjustable thereon.

22. The apparatus according to claim 21, wherein the sleeve is axially adjustable on the drive shaft adaptor.

23. The apparatus according to claim 20, wherein the cam means comprises set screws secured in threaded openings in the annular sleeve for engaging the drive shaft adaptor.

* * * * *